United States Patent [19]
Story et al.

[11] Patent Number: 6,078,939
[45] Date of Patent: *Jun. 20, 2000

[54] APPARATUS USEFUL IN FLOATING POINT ARITHMETIC

[75] Inventors: Shane A. Story, Beaverton, Oreg.; Ping Tak Peter Tang, Richmond, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/940,280

[22] Filed: Sep. 30, 1997

[51] Int. Cl.$^7$ ................................................... G06F 17/00
[52] U.S. Cl. ........................... 708/501; 708/490; 708/603
[58] Field of Search ........................... 364/750.5, 748.07, 364/736.04, 748.16, 748.01; 708/501, 490, 603

[56] References Cited

U.S. PATENT DOCUMENTS

| | | | |
|---|---|---|---|
| 4,872,131 | 10/1989 | Kubota et al. | 364/736.04 |
| 5,590,365 | 12/1996 | Ide et al. | 364/748.14 |

*Primary Examiner*—Tan V. Mai
*Attorney, Agent, or Firm*—Blakely, Sokoloff, Taylor & Zafman LLP

[57] ABSTRACT

A computer and a method of using the computer to separate a floating-point number into high and low parts and for evaluating a dominant arithmetic object and a remainder object. The dominant object is associated with the first arithmetic object by using the high parts of the floating-point number. The evaluation of a remainder arithmetic object associates the first arithmetic object with the high and low parts of the floating-point numbers. A sum of the dominant and remainder arithmetic objects returns a value corresponding to the first arithmetic object.

30 Claims, 3 Drawing Sheets

APPARATUS USEFUL IN FLOATING POINT ARITHMETIC

BACKGROUND OF THE INVENTION

1. Field of the Invention

The present invention relates generally to calculators, computers, and arithmetic errors, and more particularly to apparatus useful for reducing errors in devices doing floating-point arithmetic.

2. Description of Related Art

Due to the finite size of storage locations and registers, computers either truncate or round all real numbers to a floating-point number having a mantissa length fixed by the computer. Subsequent manipulations of floating-point numbers often involve further truncation or rounding. For example, a computer using two digit mantissas can store 1.2 and 3.4 exactly, but the same computer must generally truncate or round the product which has three digits. (i.e., 1.2×3.4=4.08) to a value of either 4.0 or 4.1. The reduction of errors arising from the floating-point arithmetic is an important consideration in computer design and operation.

The relative error is generally related to the precision of the floating-point number. If $c_e$ is the error resulting from representing c by a floating-point number fl(c), $c_e$=c−fl(c). The relative error associated with c, is defined by:

$$\text{error}_R(c) = |c_e/c| = |c - fl(c)|/|c|.$$

If fl(c) has b binary digits, $\text{error}_R(c)$ is generally of the degree of $2^{-b-1}$.

The computer evaluation of a polynomial $P_m(x)$ can propagate floating-point errors. For example, precision may be lost, because a large number of factors appear in a term of $P_m(x)$. This loss of precision becomes more important as the degree m of $P_m(x)$ increases.

Even the computer evaluation of simple polynomials can result in floating-point errors. For example, consider $P_2(x)$ =1.00+x+$x^2$. For x=0.011, the exact result is that $P_2(0.011)$= 1.100001. On a computer using three digit mantissas, an accurate evaluation should give the value fl(1.100001)=1.10. A prior art computer, with an arithmetic logic unit that rounds to three digits, performs a sequence of steps to evaluate $P_2(0.011)$. First, the computer adds 1.00 to x. Since the arithmetic logic unit manipulates three digit mantissas, the addition normally starts by rounding 1.00 and x to the three most significant digits. After rounding, 1.00 and x remain unchanged. The adder sums 1.00 and 0.011 to obtain that 1+x=1.011 and rounds to three digits to obtain 1.10. Next, the computer stores $x^2$ as fl($x^2$)=0.00101. Then, the computer adds fl($x^2$) to the previous and rounds that sum to three digits again, thus giving:

$$fl(1.10+0.001)=1.11.$$

Consequently, the computer result is that $P_2(0.011)$=1.11, i.e. the wrong result. The fact that the computer evaluation of such a simple polynomial can lead to incorrect results underlines the gravity of the problem with errors in floating-point arithmetic. As discussed above, the loss of precision due to floating-point error is potentially even more serious in polynomials of higher degree.

One prior art method to reduce errors associated with floating-point arithmetic involves employing multiple precision calculations. For example, double or quadruple precision eliminates error associated with the evaluation of 1.2×1.4 on computers employing two decimal digit mantissas. Nevertheless, multiple precision does not provide a complete solution to the occurrence of errors in floating-point arithmetic. For example, the use of double precision does not generally eliminate errors when the result is needed to double precision. Furthermore, multiple precision calculations generally require more computer resources and time than single precision calculations. Thus, alternate methods for reducing arithmetic errors are desirable.

The present invention is directed to overcoming, or at least reducing the effects of, one or more of the problems set forth above.

SUMMARY OF THE INVENTION

The invention comprises, in various embodiments, a programmed computer and a program storage device readable by the computer, tangibly embodying a program of instructions executable by the computer. The program is for evaluating a first arithmetic object. The first arithmetic object is a sum of products of floating-point numbers. The program comprises instructions for separating the floating-point numbers into high and low parts and for evaluating a dominant arithmetic object associated with the first arithmetic object by using the high parts of the floating-point numbers. The instruction for evaluating the dominant arithmetic object is quasi-exact on the computer. The program comprises instructions for: evaluating a remainder arithmetic object associated the first arithmetic object with the high and low parts of the floating-point numbers, forming a sum of the dominant and remainder arithmetic objects, and returning the sum as the value of the first arithmetic object.

BRIEF DESCRIPTION OF THE DRAWINGS

The following and other advantages of the invention will become apparent upon reading the following detailed description and upon reference to the drawings in which.

Figure 1:
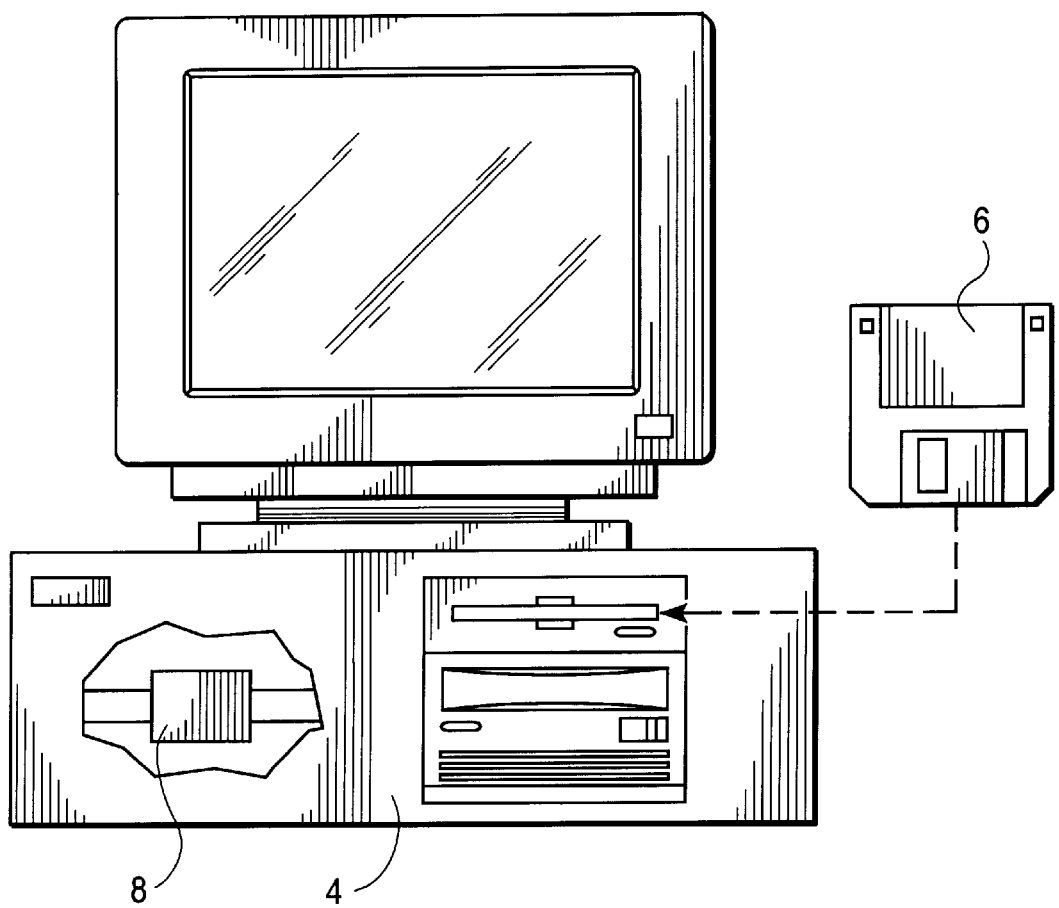
FIG. 1 illustrates an embodiment of a special computer having program to evaluate a polynomial.

While the invention is susceptible to various modifications and alternate forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

The following examples are included to demonstrate illustrative embodiments of the invention. It should be appreciated by those of skill in the art that the techniques disclosed in the examples which follow represent techniques discovered by the inventor to function well in the practice of the invention, and thus can be considered to constitute illustrative modes for its practice. However, those of ordinary skill in the art should, in light of the present disclosure, appreciate that many changes can be made in the specific embodiments that are disclosed and still obtain a like or similar result without departing from the spirit and scope of the invention.

The illustrative embodiments are a computer having a program encoded in a memory thereof, a medium encoded with the program in a computer readable form and a firmware device for evaluating arithmetic objects using floating-point arithmetic. The arithmetic objects are generally polynomials such as $P_m(x) \equiv a_0+a_1x+a_2x^2+ \ldots +a_mx^m$, or more general arithmetic objects such as $G_m \equiv d_{1,1}+d_{2,1}d_{2,2}+ \ldots +d_{m,1}d_{m,2} \times \ldots \times d_{m,m}$. The arithmetic objects are sums of products of floating-point numbers. Preferably, nonzero terms of the arithmetic objects satisfy a niceness property. An arithmetic object is defined to be nice if higher degree product terms of the arithmetic object either decrease or do not increase too fast. For $P_m(x)$, niceness is defined to mean that $h|a_ix^i| \geq |a_jx^j|$ where $a_jx^j$ is any nonzero product term for which j>i and h is a fixed number of degree 1. For the more general arithmetic objects $G_m$, nice is defined to mean that $h|d_{i,1} \times d_{i,2} \times \ldots \times d_{i,i}| \geq |d_{j,1} \times d_{j,2} \times \ldots \times d_{j,j}|$ for $d_{i,1} \times d_{i,2} \times \ldots \times d_{i,i}$ a nonzero product term and j>i. For example, truncations of the Taylor series of cos(x) and sin(x) satisfy the above-described niceness property with h=2 when $x \in [-\pi/2, \pi/2]$. The scope of the present invention is intended to cover embodiments for evaluating some set of arithmetic objects having one of the above-mentioned forms.

FIG. 1 shows an illustrative embodiment for a computer 4 for evaluating a polynomial $P_m(x)$. The computer 4 has a program 6 encoded in a memory 8 thereof. The program 6 is specially adapted for the evaluation of the polynomial $P_m(x)$ on the arithmetic logic units (not shown) of the computer 4.

Figure 2:
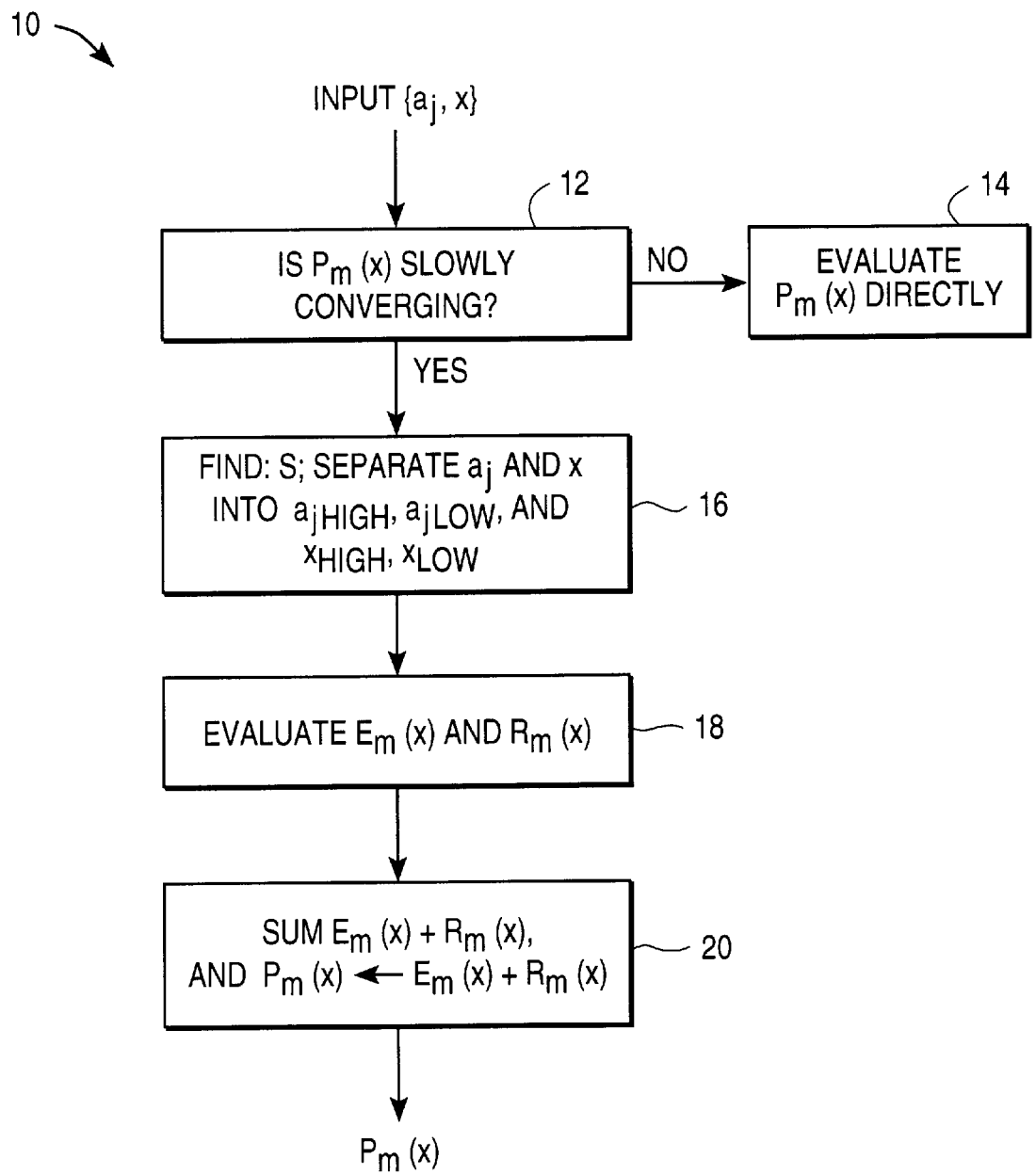
FIG. 2 is a flowchart for the program of the embodiment of FIG. 1.

FIG. 2 shows a flowchart 10 for the program 6 that the embodiment of FIG. 1 uses to evaluate the polynomial $P_m(x)$. First, in a block 12, the program 6 determines whether $P_m(x)$ is slowly converging. If $P_m(x)$ is not slowly converging, $P_m(x)$ is evaluated in a block 14 by techniques known in the art. If the polynomial $P_m(x)$ is slowly converging, the program 6 transfers control to a block 16 where each of the floating-point numbers $a_j$ and x are separated into high and low degree parts. The separation into high and low parts, by the program 6, is adapted to the degree m of the polynomial $P_m(x)$ and the size of registers of an arithmetic logic unit (not shown) of the computer 4. The program 6 and computer 4 together form a special device adapted to evaluating the $P_m(x)$. Generally, the low part of each floating number has a particular amount of shift off. A number c is defined to be shifted off with respect to a number d if $c/d < 2^{-S}$, wherein S is a positive integer defining the amount of shift off. Then, at block 18, the program 6 evaluates dominant, e.g. $E_m(x)$, and remainder, e.g. $R_m(x)$, polynomials using floating-point arithmetic. The definition of the high parts ensures that $E_m(x)$ can be quasi-exactly evaluated on the computer. The combination of the program 6 and computer 4 illustrated in FIGS. 1–2 is specially adapted to evaluate the dominant polynomial, e.g., $E_m(x)$, associated with $P_m(x)$ quasi-exactly. The definition of the low parts ensures that the terms of $R_m(x)$ are quasi-shifted off. Finally, in a block 20, the program 6 evaluates the sum $E_m(x)+R_m(x)$ and returns the sum as the value of the polynomial $P_m(x)$.

Referring to FIG. 2, a polynomial is slowly converging when successive terms do not have a rapidly decreasing magnitude. To determine whether $P_m(x)$ is slowly converging, the programmed computer 4, in the block 12, generally compares terms $a_rx^r$ having different degree r. In one embodiment, the programmed computer 4 determines that $P_m(x)$ is slowly converging at argument x when the consecutive terms of $P_m(x)$ satisfy the equation:

$|a_{j+1}x^{j+1}| > 2^{-S}|a_jx^j|$ for j=0, 1, ..., m-1.

In an alternate embodiment, the programmed computer 4 determines that $P_m(x)$ is slowly converging when it satisfies the weaker condition:

$|a_jx^j| > 2^{-S}|a_ix^i|$ for several $j,i \in \{0,1,2 \ldots m\}$

The various embodiments generally use a positive integer S to define slowly converging. The scope of the definition of slowly converging is, however, intended to also include all similar definitions of slowly converging. Alternately, an embodiment can define all polynomials to be slowly converging. In such an embodiment, the block 12 which would otherwise compare product terms of different degrees may be eliminated.

Referring to FIG. 2, the programmed computer 4 separates at the block 16 each floating-point number belonging to $\{a_i, x\}$ into high and low parts. For any z belonging to the set $\{a_i, x\}$, the high and low parts of z have several properties. First, the high and low parts are a decomposition of z, i.e., $z=z_{high}+z_{low}$. Second, $z_{low}$ satisfies a shift off relation quantifying the fact that $z_{high}$ and $z_{low}$ are the most and least significant parts respectively of z. The shift off relation can take one of two general forms. In the first form, all $z_{low}$ belonging to the set $\{a_{i,low}, x_{low}\}$ satisfy:

$|z_{low}| \leq 2^{-S}|z|$.

In the second form, all $z_{low}$ satisfy:

$|z_{low}| \leq 2^{-S} \max\{|a_i|, |x|\}$.

The integer S makes the shift off of $z_{low}$. S dependent on the degree m of $P_m(x)$ and hardware characteristics of the computer 4, because S satisfies the relation $b-(m+1)S \geq 0$, wherein b is the length of mantissas of floating-point numbers in registers of arithmetic logic units (not shown) of the computer 4. This relation determines the program 6 of FIGS. 1–2 by defining $z_{low}$. The above relationships show that the program 6 is specifically adapted to the hardware of the computer 4 and to the degree m of the polynomial, i.e. the programmed computer 4 of FIGS. 1–2 is a special machine for evaluating $P_m(x)$. In the illustrative embodiments, the same positive integer S appears in the definition of slowly converging and in the form of the shift off relation. Nevertheless, the scope of the present invention is intended to include embodiments, in which these two integers are different. As is shown below, the program 6 defines $z_{high}$ and $z_{low}$ so that, on the specific computer 4 of FIG. 1, the evaluation of $P_m(x)$ is a sum of a dominant polynomial that is quasi-exactly evaluated and a remainder polynomial that is quasi-shifted off.

Several definitions of $z_{low}$ and $z_{high}$ satisfy one of the shift off relations. In binary form, the floating-point number $z=0.y_1y_2 \ldots y_Sy_{S+1} \ldots y_b \times 2^a$, wherein the $y_v$'s are 0 or 1, and a is an integer. One definition of $z_{low}$ and $z_{high}$ satisfying the first form of the shift off relation is given by:

$z_{high}=0.y_1y_2 \ldots y_S \times 2^a$, and $z_{low}=0.y_{S+1} \ldots y_b \times 2^{a-S}$.

In this definition, $z_{high}$ contains the S most significant digits of z, and $z_{low}$ contains the remaining b–S digits of z. For example, for six digit mantissas, S=2, and z=0.110101, $z_{high}=0.11$, and $z_{low}=0.101 \times 2^{-3}$. An alternate definition of $z_{high}$ and $z_{low}$ is given by making $z_{high}$ equal to z rounded to S digits. Then, $z_{low}$ is defined by $z_{low}=z-z_{low}$. Another alternate definition of $z_{high}$ and $z_{low}$ uses an invertible, intrinsic function of argument z that returns a value to about S digits of accuracy. For example, suppose that the computer has another software program defining a function frcpa(z) which evaluates $z^{-1}$ to about S digits. Then, the definitions $z_{high}$=frcpa(frcpa(z)) and $z_{low}=z-z_{high}$ satisfy the first form of the shift off relation. To obtain a definition of $z_{high}$ and $z_{low}$ satisfying the second form of the shift off relation, it is generally necessary to find the $w \in \{a_i, x\}$ that has the largest absolute value. If $w$ is given by $w = 0.y_1y_2 \ldots y_Sy_{S+1} \ldots y_b \times 2^a$, the high and low part of $w$ are:

$$w_{high} = 0.y_1y_2 \ldots y_S \times 2^a, \text{ and } w_{low} = 0.y_{S+1} \ldots y_b \times 2^{a-S}.$$

For other members of $\{a_i, x\}$, $z_{high}$ and $z_{low}$ are defined by:

$$z_{high} = 2^{-S+a} int(z 2^{S-a}) \text{ and } z_{low} = z - z_{high}.$$

The function $int(v)$ takes the integer part of a floating-point number $v$. For example, if $P_1 = 1.0101 + 0.001101x$, $x = 0.01011$ and $S = 3$, $a_{0,high} = 1.01$, $a_{1,high} = 0.00$, $x_{high} = 0.01$, $a_{0,low} = 0.0001$, $a_{1,low} = 0.001101$, and $x_{low} = 0.00011$. The scope of the present invention is intended to include all definitions of $z_{high}$ and $_{low}$ that satisfy either the first or second shift off relation.

Referring to FIG. 2, the programmed computer 4, at the block 18, evaluates dominant, e.g. $E_m(x)$, and remainder, e.g. $R_m(x)$, polynomials. By starting from $P_m(x)$, $E_m(x)$ and $R_m(x)$ are determined constructively. The first term of $P_m(x)$, e.g. $a_0$, is split into high and low parts:

$$a_0 = a_{0,high} + \{a_{0,low}\}.$$

The high part is the lowest term of $E_m(x)$, and the term in brackets is the lowest term of $R_m(x)$. The next term of $P_m(x)$, e.g. $a_1x$, is split into high and low parts by writing $a_1$ as $a_{1,high} + a_{1,low}$ and then adding and subtracting $a_{1,high}x_{high}$.

$$a_1 x = (a_{1,high} + a_{1,low})x = a_{1,high}x_{high} + a_{1,high}(x - x_{high}) + a_{1,low}x$$

$$= a_{1,high}x_{high} + \{a_{1,high}x_{low} + a_{1,low}x\}.$$

The first term on the right hand side is the second term of $E_m(x)$, and the bracketed term is the second term of $R_m(x)$. For an arbitrary term $a_rx^r$ of $P_m(x)$, the general form of the splitting is given by:

$$a_r x^r = (a_{r,high} + a_{r,low})x^r = a_{r,high}x_{high}^r + a_{r,high}(x^r - x_{high}^r) + a_{r,low}x^r$$

$$= a_{r,high}x_{high}^r + \{a_{r,high}x_{low}(x^{r-1} + x^{r-2}x_{high} + \ldots + x_{high}^{r-1}) + a_{r,low}x^r\}$$

The first term of the last equation is the (r+1)-th term of $E_m(x)$ and the remaining terms in brackets are the (r+1)-th contribution to $R_m(x)$. The construction leads to the following forms for $E_m(x)$ and $R_m(x)$:

$$E_m(x) = a_{0,high} + a_{1,high}x_{high} + \ldots + a_{m,high}x_{high}^m$$

$$R_m(x) = a_{0,low} + a_{1,high}x_{low} + a_{1,low}x + \ldots +$$

$$a_{m,high}x_{low}(x^{m-1} + x^{m-2}x_{high} + \ldots + x_{high}^{m-1}) + a_{m,low}x^m$$

The terms of $R_m(x)$ having a factor of $x_{low}x^{r-v}(x_{high})^{v-1}$ or $x^r$ correspond to the terms of $E_m(x)$ having a factor of $(x_{high})^r$. Generally, several terms of $R_m(x)$ correspond to the same term of $E_m(x)$. Each term of $R_m(x)$ has, at least, one factor of $x_{low}$ or $a_{low}$ replacing a factor of $x_{high}$ or $a_{high}$ in the corresponding term of $E_m(x)$. Thus, the terms of $R_m(x)$ are quasi-shifted off by a factor of $2^{-S}$ with respect to the corresponding terms of $E_m(x)$. Quasi-shifted off means shifted off for the first form of the shift off relation. For the second form of the shift off relation, quasi-shifted off means that each term of $R_m(x)$ is shifted off by $2^{-S}$ with respect to the $w_{high}$, wherein $w_{high}$ is the term of $E_m(x)$ having the largest absolute value.

Since the product $a_{m,high}(x_{high})^m$ contains not more than (m+1)S digits and $b-(m+1)S \geq 0$, each term of $E_m(x)$ is evaluated without rounding, i.e. the program 6 and hardware of the computer 4 are adapted to evaluate the dominant polynomial associated to $P_m(x)$. If successive product terms $a_{r,high}(x_{high})^r$ line up in the register of a binary adder when expressed with the same exponent, $E_m(x)$ is evaluated exactly on the programmed computer 4 of FIGS. 1–2. The first form of the shift off relation limits the amount of misalignment of product terms and thus limits the amount of rounding during the addition of successive terms to evaluate $E_m(x)$. The term quasi-exactly evaluated will be employed for polynomials like $E_m(x)$ which are exactly evaluated up to this limited misalignment of terms. Alternate forms of the shift off relation insure the exact evaluation of $E_m(x)$, even in the presence of the misalignment of successive product terms. For example, if $b-S(2m+1) \geq 0$, then $E_m(x)$ is exactly evaluated by the computer 4. For definitions of $z_{high}$ and $z_{low}$ satisfying the second form of the shift off relation, successive terms of $E_m(x)$ automatically line up when placed in a binary adder, and $E_m(x)$ is exactly evaluated on the arithmetic logic units of the computer 4 with the program 6 of FIGS. 1–2. The scope of the present invention is intended to include all similar variations of the definitions of $z_{high}$ and $z_{low}$, in the program 6, when such variations are adapted to give, at least, quasi-exact evaluations of $E_m(x)$ on the hardware of the computer 4. External considerations, such as calculation speed and the form of polynomials evaluated, frequently determine whether it is preferable to use a shift off relation for which $E_m(x)$ is quasi-exactly or exactly evaluated.

Referring to FIG. 2, the program at the block 20 forms the sum $E_m(x) + R_m(x)$ and returns the sum as the value of $P_m(x)$. By evaluating $E_m(x)$, and $R_m(x)$ separately and then adding, the floating-point error associated with a loss of significance is generally reduced. As an example, consider the above-described evaluation of $P_2(x) = 1.00 + x + x^2$, for $x = 0.0110$, in a computer employing arithmetic logic units with registers that hold three binary digit mantissas. A calculation that did not separately evaluate $E_2(x)$ and $R_2(x)$ was shown above to give the result that $P_2(0.0110) = 1.11$ instead of the correct result that $fl(P_2(0.0110)) = 1.10$. For $P_2(x)$ and a hardware that manipulates three digit mantissas, it is straightforward to show that $S = 1$, and that the first form of the shift off relation is satisfied by letting $z_{high}$ equal $z$ rounded to one digit. Thus, $x_{high} = 0.10$, $x_{low} = -0.001$, $a_{0,high} = 1.00$ and $a_{0,low} = 0$. Then, it follows that $E_2(0.10) = 1.11$ and that $R_2(0.011) = -0.010$, and the sum $E_2(0.10) + R_2(0.011)$ is equal to 1.10. The programmed computer of the example gives the correct value to the computer's precision.

The value of the shift off $S$ is generally a function of the degree of the polynomial $P_m(x)$. Preferably, an embodiment employs the largest value of $S$ possible for a particular computer 4 and $P_m(x)$, i.e. preferably the program 6 is specially adapted to the computer 4 and the given polynomial $P_m(x)$ to maximize the shift off $S$. A particular embodiment can employ additional features for increasing $S$. For example, some embodiments separate $P_m(x)$ into slow, e.g. $S_k(x)$, and trailing, e.g. $T(x)$ polynomials. $S_k(x)$ is generally a slowly converging polynomial not containing all the terms of $P_m(x)$. To find $S_k(x)$, the programmed computer 4 finds the term $w$ of $P_m(x)$ having the largest absolute value, i.e. $|w| \geq |a_rx^r|$ for $r = 0, 1, 2, \ldots, m$. Then, $S_k(x)$ satisfies the equation:

$$S_k(x) = \sum_{q=0}^{k} a'_q x^q,$$

wherein $a'_q = a_q$ if $|a_q x^q| \geq 2^{-S}|w|$, and otherwise $a'_q = 0$.

The trailing part, $T(x)$, is the rest of $P_m(x)$, i.e. $T(x) = P_m(x) - S_k(x)$. The terms of $T(x)$ are shifted off with respect to the terms of $S_k(x)$. $T(x)$ is evaluated by methods already known in the art, and $S_k(x)$ is evaluated by the program 6 of FIGS. 1–2. For $S_k(x)$, the new shift off S' satisfies the relation $b-(k+1)S' \geq 0$, wherein k is the degree of $S_k(x)$. Since k can in general be less than m the degree of $P_m(x)$, the new shift off S' of $S_k(x)$ can be smaller than the shift off S of the original $P_m(x)$. The scope of the present invention is intended to include embodiments that split $P_m(x)$ into $S_k(x)$, $T(x)$ and embodiments that do not split $P_m(x)$.

Figure 3:
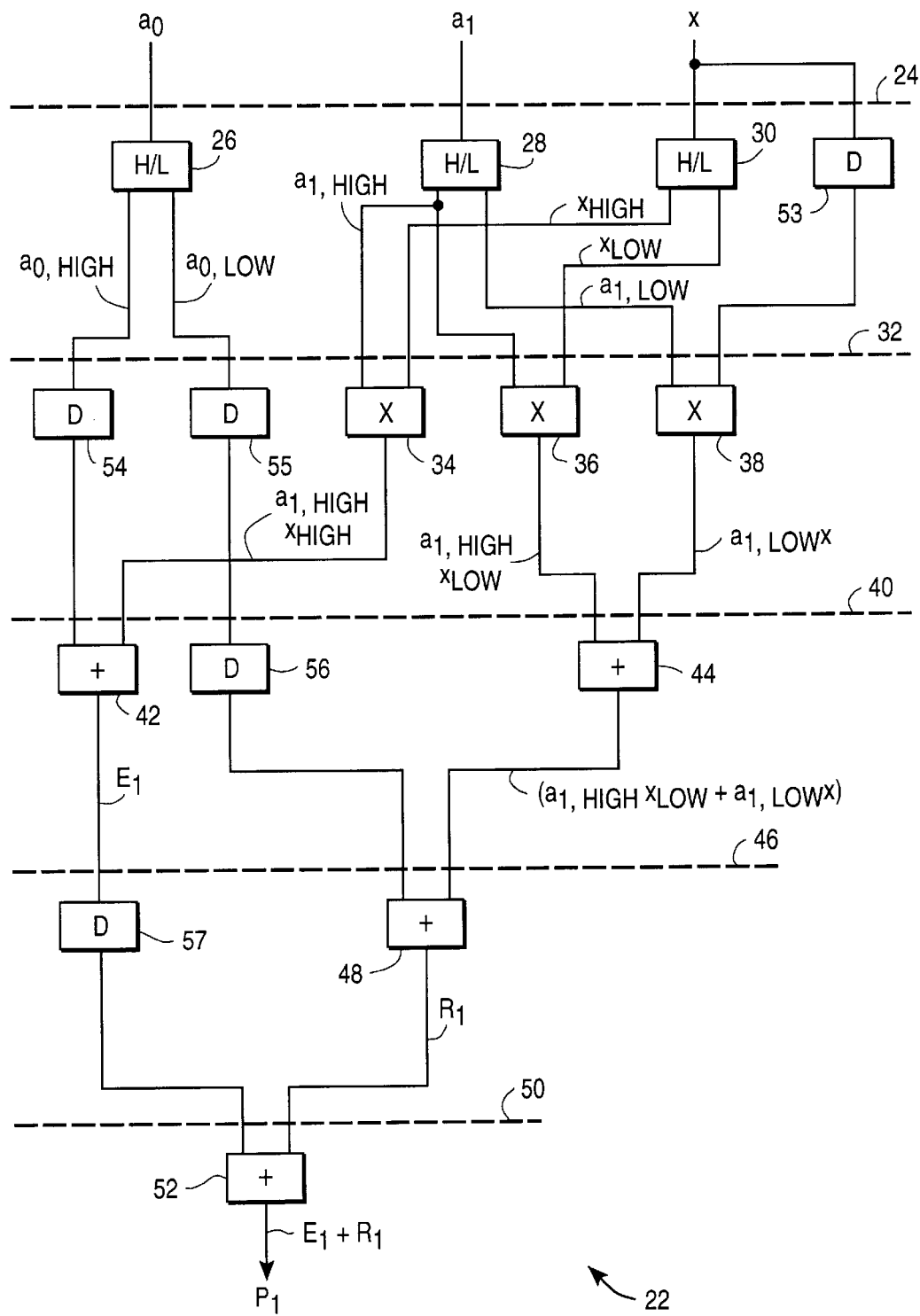
FIG. 3 illustrates a firmware device that evaluates the polynomial $P_1(x)$.

FIG. 3 illustrates a firmware structure 22 for evaluating $P_1(x)$ according to the present invention. At the highest level 24, $a_0$, $a_1$, and x enter separators 26, 28, 30 that determine the high and low parts of a floating number. The illustrated embodiment assumes that all $P_1(x)$ are slowly converging and therefore does not compare $a_0$ to $a_1$ x as contrasted to the block 12 of FIG. 2. Alternate embodiments of the firmware device do generally compare $a_0$ to $a_1$ x to determine whether the polynomial is slowly converging, i.e. $a_1 x > 2^{-S} a_0$. In such embodiments, additional hardware, known in the art, would be added to the firmware device of FIG. 3 to implement the function of the block 14 of the program of FIG. 2. The separators 26, 28, 30 produce high and low parts satisfying the first form of the shift off relation. To produce high and low parts satisfying the second form of the shift off relation, the separators 26, 28, 30 generally also include elements (not shown) for comparing $a_0$, and $a_1 x$. Generally, combinations of the same elements can determine whether $P_1(x)$ is slowly converging in an alternate embodiment. At the next level 32, multipliers 34, 36, 38 form the product $a_{1,high} x_{high}$ appearing in $E_1(x)$ and the products $a_{1,high} x_{low}$ and $a_{1,low} x$ appearing in $R_1(x)$. At the next level 40, an adder 42 performs the sum $a_{0,high} + a_{1,high} x_{high}$ to obtain $E_1(x)$, and a second adder 44 performs a partial sum of the remainder $R_1(x)$ by adding the product terms $a_{1,high} x_{low}$ and $a_{1,low} x$. In the next level 46, an adder 48 sums the output of the adder 44 and the term $a_{o,low}$ to obtain $R_1(x)$. At the final level 50, an adder 52 performs the sum $E_1(x) + R_1(x)$ and stores the result as $P_1(x)$. The firmware structure 22 contains several delay elements 53–57 that enable the arithmetic operations to be performed simultaneously in a pipelined device. The scope of the present invention is intended to include pipelines that generalize the firmware structure 22 of FIG. 3 to polynomials of higher degree. In light of the present disclosure, such generalizations are straightforward to construct and use by persons of ordinary the skill in the art.

All of the methods and apparatus disclosed and claimed herein can be made and executed without undue experimentation in light of the present disclosure. While the apparatus and methods of this invention have been described in terms of illustrative embodiments, it will be apparent to those of skill in the art that variations may be applied to the methods and apparatus herein without departing from the concept, spirit and scope of the invention. All such similar variations and modifications apparent to those skilled in the art are deemed to be within the spirit, scope and concept of the invention as defined by the appended claims.

We claim:

1. A machine-readable medium having stored thereon a set of instructions for execution on a computer, said instructions when executed by the computer evaluate a first arithmetic object comprising a sum of products of floating point numbers such that an improved precision result is generated, said evaluation comprising:

separating each of said floating-point numbers into high and low parts based upon a register length of said computer;

evaluating a dominant arithmetic object associated with said first arithmetic object utilizing the high parts of said floating-point numbers by multiplication and addition which is quasi-exact on said computer;

evaluating a remainder arithmetic object associated with said first arithmetic object utilizing the high and low parts of said floating-point numbers by multiplication and addition; and summing the dominant and remainder arithmetic objects to generate an improved precision result.

2. The machine-readable medium of claim 1, wherein said first arithmetic object is defined as $P_m(x)$, said dominant arithmetic object is defined as $E_m(x)$, and said remainder arithmetic object is defined as $R_m(x)$.

3. The machine-readable medium of claim 2, wherein $E_m(x)$ is evaluated exactly utilizing said high parts of said floating-point numbers.

4. The machine-readable medium of claim 2, wherein $R_m(x)$ is shifted off with respect to $E_m(x)$.

5. The machine-readable medium of claim 1, wherein said separating each of said floating-point numbers into high and low parts comprises decomposing a floating number z into components $z_{high}$ and $z_{low}$, wherein $z_{low}$ satisfies $|z_{low}| \leq 2^{-s}|z|$, where S is a positive integer.

6. The machine-readable medium of claim 5, wherein said positive integer S satisfies $b-(m+1)S \geq 0$, said positive integer b being the length of mantissas in at least one register of an arithmetic logic unit for floating-point arithmetic in said computer.

7. The machine-readable medium of claim 6, wherein the high and low parts of the floating-point numbers are the S most significant and the b–S least significant binary digits of the floating-point numbers.

8. The machine-readable medium of claim 1, wherein said evaluation of said first arithmetic object further comprises separating said first arithmetic object into slow and trailing polynomials.

9. An apparatus for separating a first arithmetic object comprised of a sum of products of floating-point numbers into component objects for improved precision in reaching a result comprising:

a separator for receiving said first arithmetic object and separating said floating-point numbers into high and low parts;

a first processing device coupled to said separator to multiply and add the high parts of said floating-point numbers to obtain a dominant arithmetic object, which is quasi-exact;

a second processing device coupled to said separator to multiply and add the high and low parts of said floating-point numbers to obtain a remainder arithmetic object;

an adder coupled to said two processing devices for summing the dominant and remainder arithmetic objects as the result.

10. The apparatus of claim 9, wherein said first arithmetic object is a polynomial and said separates said polynomial into slow and trailing polynomials.

11. The apparatus of claim 9, wherein said first arithmetic object is a polynomial $P_m(x)$, in which said separator separates said $P_m(x)$ into high and low parts to obtain said dominant arithmetic object, $E_m(x)$, and said remainder arithmetic object, $R_m(x)$.

12. The apparatus of claim 11 further including a comparator coupled to receive said first arithmetic object and compare polynomial terms of said polynomial to determine whether $P_m(x)$ is slowly converging.

13. The apparatus of claim 12, wherein said $E_m(x)$ is exactly calculated from said high parts by said first processing device.

14. The apparatus of claim 12, wherein said $R_m(x)$ is shifted off with respect to said $E_m(x)$ for obtaining the result of improved precision.

15. The apparatus of claim 9, wherein said separator separating the floating-point numbers decomposes each floating-point number z into $z_{high}$ and $z_{low}$, and $z_{low}$ satisfies $|z_{low}| \leq 2^{-S}|z|$, wherein S is a fixed positive integer.

16. The apparatus of claim 15, wherein said positive integer S satisfies $b-(m+1)S \geq 0$, said positive integer b being the length of mantissas of a register coupled to an arithmetic logic unit of said processing devices.

17. The apparatus of claim 16, wherein the high and low parts of the floating-point numbers are the S most significant and the b−S least significant binary digits of the floating-point numbers.

18. An apparatus for evaluating a first arithmetic object comprising a sum of products of floating-point numbers to generate an improved precision result comprising:

means, coupled to receive said first arithmetic object, for separating each of said floating-point numbers into high and low parts based upon a register length of said apparatus;

first means for evaluating a dominant arithmetic object associated with said first arithmetic object utilizing the high parts of said floating-point numbers by multiplying and adding said high parts quasi-exactly, said first means for evaluating coupled to said means for separating;

second means for evaluating a remainder arithmetic object associated with said first arithmetic object utilizing the high and low parts of said floating-point numbers by multiplying and adding, said second means for evaluating coupled to said means for separating; and means for summing said dominant and remainder arithmetic objects received from said first and second means for evaluating to generate said improved precision result.

19. The apparatus of claim 18, wherein said first arithmetic object comprises a polynomial $P_m(x)$, and said means for separating comprises means for separating $P_m(x)$ into slow and trailing polynomials $S_k(x)$ and $T(x)$, respectively.

20. The apparatus of claim 18, wherein said first arithmetic object comprises a polynomial $P_m(x)$, said means for separating comprising means for separating $P_m(x)$ into high and low parts to obtain said dominant arithmetic object $E_m(x)$, and said remainder arithmetic object $R_m(x)$.

21. The apparatus of claim 20, wherein said first means for evaluating evaluates $E_m(x)$ exactly.

22. The apparatus of claim 20, further comprising means for comparing polynomial terms of said first arithmetic object to determine whether $P_m(x)$ is a slowly converging polynomial, said means for comparing coupled to receive said first arithmetic object.

23. The apparatus of claim 18, wherein said first and second means for processing comprise a single means.

24. The apparatus of claim 18, wherein all of said means are implemented in a firmware apparatus within a computer.

25. A method implemented in a computer program for evaluating a polynomial $P_m(x)$ where $P_m(x)$ is defined by $$P_m(x) = \sum_{n=0}^{m} a_r x^n,$$

the variables $a_r$ and x being floating-point numbers, such that an improved precision result is generated comprising:

comparing terms of the polynomial $P_m(x)$ to determine whether $P_m(x)$ is a slowly converging polynomial;

separating high and low parts of the variables $a_r$ and x based upon a register length of said computer in response to a determination that $P_m(x)$ is a slowly converging polynomial;

evaluating a dominant arithmetic object, $E_m(x)$, associated with said first arithmetic object utilizing the high parts of the variables $a_r$ and x by multiplication and addition which is quasi-exact;

evaluating a remainder arithmetic object, $R_m(x)$, associated with said first arithmetic object utilizing the high and low parts of the variables $a_r$ and x by multiplication and addition;

summing $E_m(x)$ and $R_m(x)$ to generate an improved precision result.

26. The method of claim 25, wherein the polynomial $P_m(x)=a_0+a_1x$, said evaluating a dominant arithmetic object, $E_m(x)$ comprises evaluating a dominant arithmetic object, $E_m(x)=a_{0,high}+a_{1,high}x_{high}$, and said evaluating a remainder arithmetic object, $R_m(x)$ comprises evaluating a remainder arithmetic object, $R_m(x)=a_{0,low}+a_{1,high}x_{low}+a_{1,low}x$.

27. The method of claim 25, wherein the high part of a floating-point number is given by the S most significant digits of the binary number, said S being a fixed positive integer.

28. A firmware apparatus of a computer for separating a polynomial $P_m(x)$ into component objects for improved precision in reaching a result comprising:

a plurality of separators coupled to receive inputs corresponding to $P_m(x)$ for separating floating-point numbers of $P_m(x)$ into high and low parts;

a plurality of multipliers and adders coupled to receive outputs of said separators for processing the outputs to obtain a dominant object $E_m(x)$ and a remainder object $R_m(x)$;

an adder coupled to said separators and said multipliers to sum $E_m(x)$ and $R_m(x)$ to obtain the result.

29. The firmware apparatus of claim 28, wherein said $P_m(x)$ has m equal to one.

30. The firmware apparatus of claim 28, further comprising a means for determining whether $P_m(x)$ is a slowly converging polynomial.

* * * * *

UNITED STATES PATENT AND TRADEMARK OFFICE
CERTIFICATE OF CORRECTION

PATENT NO.     : 6,078,939
DATED          : June 20, 2000
INVENTOR(S)    : Story et al.

It is certified that error appears in the above-identified patent and that said Letters Patent is hereby corrected as shown below:

Column 5,
Line 42, delete "$x^{r3}$" and insert -- $x^{r-3}$ --.
Line 42, delete "$x^{r1}$" and insert -- $x^{r-1}$ --.

Signed and Sealed this

Twenty-sixth Day of March, 2002

Attest:

*Attesting Officer*

JAMES E. ROGAN
*Director of the United States Patent and Trademark Office*